United States Patent [19]

Margraf

[11] 3,933,978

[45] *Jan. 20, 1976

[54] METHOD OF FILTERING DUST-LADEN GASES

[76] Inventor: Adolf Margraf, Im Haberkamp 196, 4961 Wendthagen, Germany

[ * ] Notice: The portion of the term of this patent subsequent to Sept. 10, 1991, has been disclaimed.

[22] Filed: Mar. 22, 1973

[21] Appl. No.: 343,803

Related U.S. Application Data

[63] Continuation-in-part of Ser. No. 230,721, March 1, 1972, Pat. No. 3,834,123.

[30] Foreign Application Priority Data

Mar. 28, 1972 Germany............................ 2215065

[52] U.S. Cl. ............. 423/215.5; 423/240; 423/244; 55/71; 55/73; 55/96
[51] Int. Cl.$^2$........................................ B01D 53/34
[58] Field of Search................ 423/215.5, 240, 244; 55/71, 73, 96

[56] References Cited
UNITED STATES PATENTS

| | | | |
|---|---|---|---|
| 2,919,174 | 12/1959 | Pring................................... | 423/240 |
| 3,834,123 | 9/1974 | Margraf................................ | 55/96 |

Primary Examiner—Earl C. Thomas
Attorney, Agent, or Firm—Karl F. Ross; Herbert Dubno

[57] ABSTRACT

This invention relates to filtering dust or smoke-laden gases that contain dust particles by use of a pocket or bag-filter, in which, depending on the characteristics of the dust, the dust filtered out in the filter is extracted therefrom in quantities corresponding approximately to 2 to 100 times the proportion of dust arriving per unit of time in the gas to be filtered. This agglomerates the fine dust which is then continuously fed back to the incoming dust-laden gas prior to, or in, the filter. Thereafter, a quantity of incident dust is removed from the filter, this quantity corresponding to the amount of dust contained in the dirty gas per unit of time.

In accordance with this invention, a chemical additive substance is fed to the dust which is to be fed back continuously in circuit to the filter and which is incident on or is to be agglomerated in the filter, said substance being capable of reacting with any chemical contaminants contained in the dust-laden gas so as to form filterable substances. The chemical additive may be in the form of a powder or suspension and may be an oxide or hydroxide of an alkaline metal, an alkaline-earth metal or aluminum.

5 Claims, No Drawings

METHOD OF FILTERING DUST-LADEN GASES

This application relates to (is a continuation-in-part of) and is an improvement over parent application Ser. No. 230,721 filed Mar. 1, 1972 (now U.S. Pat. No. 3,834,123 Sept. 10, 1974).

The present invention relates to a method of filtering dust or smoke-laden gases containing dust particles, using a pocket or bag-filter, in which, depending on the characteristics of the fine dust, the dust filtered out in the filter is extracted from the filter in quantities corresponding approximately to 2 to 100 times the proportion of fine dust arriving per unit of time in the gas to be filtered, in order to agglomerate the fine dust, and is continuously fed back to the dust-laden gas to be cleaned prior to, or in, the filter, and a quantity of dust is removed from the filter which corresponds to the amount of dust contained in the dust-laden gas to be cleaned per unit of time.

In special cases, gaseous or vaporous sulphur or chlorine compounds are contained in smoke or dust-laden gases which are harmful to the environment and must therefore be removed from the gases so that they cannot escape into the open air along with the cleaned gases.

It is already known to feed chemical substances (additives) into smoke-laden gases containing sulphur compounds, e.g. sulphur dioxide, which form chemical compounds with the sulphur dioxide in such a way that the resultant compounds are insoluble, or only partly soluble, in water and can therefore be dumped at suitable spots without affecting the water in the ground to an excessive extent. In this connection, it has already been proposed to feed calcium compounds into the smoke-laden gases from oil-fired power stations, for example, in the combustion space in the boilers downstream of electrical precipitators or wet-cleaning equipment, by spraying them into the combustion gases in powder form or as suspensions. A similar method is used when the contamination is a chlorinated compound.

In practice it has been shown (see the journal "Chemieingenieur-technik" 1972, Nos. 1 and 2, article by A. M. Squires) that only a very small percentage of sulphur or chlorine compounds can be cleaned from smoke or dust-laden gas by the measures mentioned above, which is probably chiefly attributable to the fact that the time available for compounding sulphur and chlorine with the chemical additive is relatively short, or that, when it is intended that fairly high desulphurization levels shall be attained, the effort expended becomes uneconomical, very large excess quantities of additive having to be put in, the major part of which must be considered as waste. To a considerable extent, the negligible de-sulphurizing action in electrical precipitators or wet-cleaning apparatus when chemical additives are used is also due to the fact that the gas to be cleaned can pass through such apparatus without being split up into a large number of small partial streams.

An important object of the invention therefore is to give the sulphur or chlorine compounds contained in the gases to be cleaned sufficient time for the sulphur or sulphur dioxide or the chlorine ions to react with the chemical additives used and, at the same time, to put additives in the gases to be cleaned and supplying them in such a way that no losses, or only extremely small ones, occur to any additives which do not react with the sulphur or chlorine in the sulphur or chlorine compounds contained in the gases to be cleaned.

To this end, the invention consists in that chemical additive substance, advantageously in powder or suspension form, is fed to the dust which agglomerates in the filter, and which is to be continuously fed back in circuit to the filter, using the method mentioned above, these substances reacting with chemical contaminations such as sulphur or chlorine, contained in the dust-laden gas, to form solid, filterable substances.

The invention enables a simple and economical combination of the sulphur or chlorine in sulphur or chlorine compounds contained in the gas to be cleaned with the additive, either to the desired extent or completely or almost completely. By using a pocket or bag filter, the incident stream of gas to be cleaned is split up into a large number of minute partial streams, so that the probability of the sulphur or chlorine compounds contained in the gas to be cleaned encountering the powdered additives is significantly increased. The chemical additive substance may also be added to the stream of gas as a suspension if the gas to be cleaned is at a high temperature since the water from the suspension can then be condensed in the filter while the additive remains behind as powder. Chiefly, however, it is now possible to put additives into the gas to be cleaned in any desired excess without or practically without loss, or to put in only sufficient additive as is normally required to compound the sulphur or chlorine in the gas to be cleaned which arrives per unit of time, while, at the same time, as great an excess amount of additive as desired for the chemical reaction can be achieved since any additive which does not produce a reaction is also fed back into the filter along with the feedback of dust so that any desired excess of additive can be produced which is capable of causing the sulphur or chlorine compounds in the gas to be cleaned to react completely or almost completely with the additive. If there is not sufficient time for the sulphur or chlorine compounds to react with the additive it is, of course, possible to increase the number of feedback circuits for the dust arriving at the filter as required.

The combination of method steps, namely the optional number of feedback cycles for the dust to the pocket or bag filters, and the supply of additives, thus make it possible to force the additives utilized to react with the sulphur or chlorine compounds contained in the smoke-laden gases or the like with only small losses, it being also possible to feed the additives into the gas to be cleaned either continuously or intermittently.

For the purposes of reacting the sulphur or chlorine in the sulphur or chlorine compounds in the smoke or dust-laden gas to be cleaned, or the sulphur dioxide and/or chlorine ions contained in these gases, with the additives which have been fed to the gas to be cleaned in powder or suspension form the additives chiefly used consist of oxides or hydroxides of the alkali metals, the alkaline-earth metals, aluminum, or other chemical substances, which react with the sulphur or chlorine in the sulphur or chlorine compounds contained in the dust-laden gas to form solid, filterable substances. In this way calcium oxide (burnt lime), calcium hydroxide, sodium hydroxide, potassium hydroxide, dolomite (calcium-magnesium carbonate), magnesium (semi-calcined dolomite), for example, may be used as additives in the form of dry powders or suspensions.

It can be seen that, by using pocket or bag filter systems with an in-circuit dust feed-back, the addition of additives results in a particularly simple method and a particularly simple apparatus for causing the sulphur or the chlorine in the sulphur or chlorine compounds contained in smoke or dust-laden gas to react completely or almost completely to form solid, filterable substances without large losses of additives occuring.

I claim:

1. A method of filtering a contaminated gas containing fine dust particles and sulphur or chlorine compounds which comprises the steps of:
    feeding the contaminated gas to a pocket-type filter and through the filter;
    collecting particles from said contaminated gas on said filter;
    releasing collected particles from the surface of said filter;
    recycling dust released from the filter surface in an amount of 2 to 100 times the amount of fine dust contained in the contaminated gas and entering the filter per unit time to the contaminated gas immediately prior to the passage thereof through the filter whereby both recycled dust and the original dust in the contaminated gas are carried onto said surface;
    discharging a portion of the released dust equal to the amount of fine dust contained in the contaminated gas and entering the filter per unit time; and
    feeding a chemical additive substance reactive with said compounds to form filterable products to the recycled dust prior to its introduction into the contaminated gas.

2. The method defined in claim 1 wherein the quantity of said substance added to the recycled gas per unit time corresponds to the amount necessary to react with said compounds carried onto said filter surface per unit time.

3. The method defined in claim 1 wherein said substance is an oxide or hydroxide of an alkali metal, an alkaline-earth metal or aluminium.

4. The method defined in claim 1 wherein said substance is a powder.

5. The method defined in claim 1 wherein said substance is introduced in the form of a suspension.

* * * * *